Nov. 13, 1956 D. R. RANKIN 2,770,477
MECHANICAL SEAL
Filed July 30, 1951 2 Sheets-Sheet 1
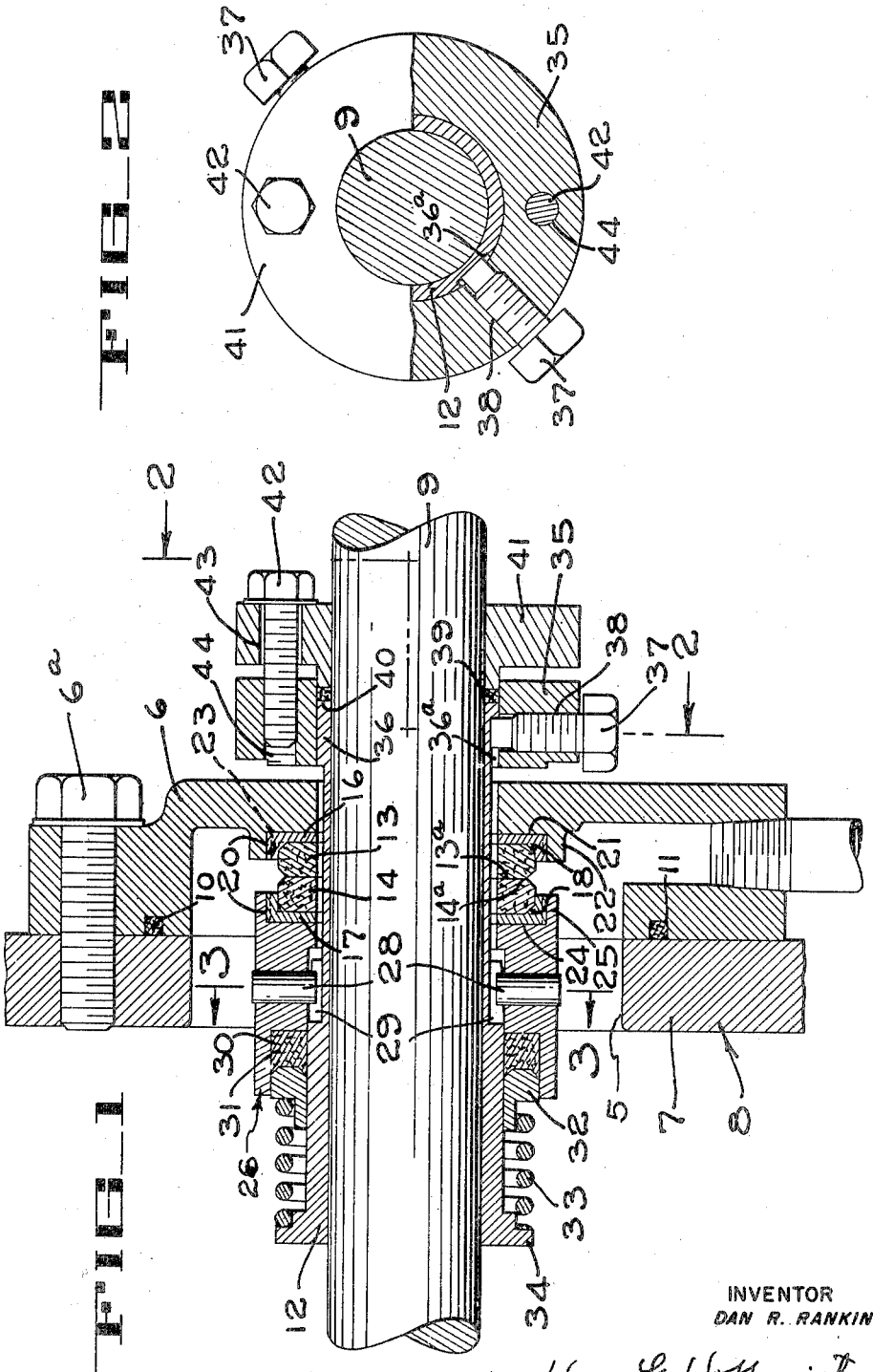
INVENTOR
DAN R. RANKIN
BY Hans G. Hoffmeister
ATTORNEY

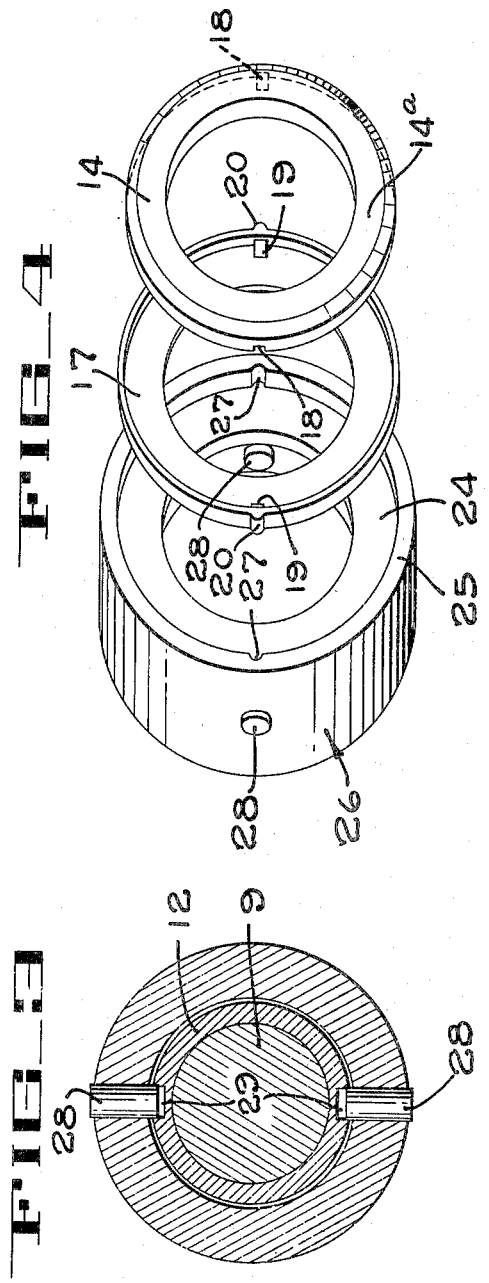

United States Patent Office 2,770,477
Patented Nov. 13, 1956

2,770,477

MECHANICAL SEAL

Dan R. Rankin, Altadena, Calif., assignor to Food Machinery and Chemical Corporation, San Jose, Calif., a corporation of Delaware Application July 30, 1951, Serial No. 239,330

2 Claims. (Cl. 286—11.15)

The present invention relates to mechanical seals of the type which are provided to prevent fluid leakage between relatively movable members. More particularly, the invention concerns a mechanical seal which is applicable to rotary pumps and similar hydraulic mechanisms, wherein a rotary shaft must pass through the stationary housing of the mechanism.

Mechanical seals of this type include usually a pair of relatively rotatable elements, one associated with the stationary housing and the other with the rotary shaft, which must be held in sealing engagement. Considerable difficulty has been experienced in providing a material for such seal elements which will remain effective under severe operating conditions such as are created by the presence of corrosive liquids or liquids heavily charged with abrasives, high temperatures and/or high pressures. In particular, abrasive conditions have proven extremely troublesome. Thus, when the two relatively rotatable seal elements are made from equally hard materials, as is the practice under ordinary conditions, abrasive particles interpose themselves between said elements and tend to force the elements apart and/or score the surfaces of both elements. Seals employing seal elements of equal hardness therefore do not ordinarily remain effective when employed under abrasive conditions. Seals designed to handle abrasive liquids have therefore been constructed from seal elements of different hardness. Thus, as an example, one seal element may be composed of a hard material, such as Stellite, while the other is formed of soft material, such as carbon. The theory is that when abrasive particles interpose themselves between seal elements of unequal hardness, they become imbedded in the softer material and, thus, do not impair the effectiveness of the seal. However, in seals of this latter type, the softer seal element deteriorates rapidly under abrasive conditions so that frequent replacements become necessary.

Recent investigations have shown that seals wherein both seal elements are made of one of the cemented carbides, such as cemented tungsten carbide or boron carbide, prove highly satisfactory under abrasive operating conditions and exhibit none of the deficiencies noted in the previously known seal constructions. In early attempts to incorporate cemented carbide elements in mechanical seals of the type referred to, said elements were cemented into metallic mountings. However, the described cemented carbides have a markedly different expansion coefficient as compared with their mountings. Under high operating temperatures, therefore, the said elements or their mountings cracked or the engaged faces of the seal elements became distorted which impaired the effectiveness of the seal. Therefore, in spite of their valuable characteristics, the practical employment of cemented carbides in mechanical seals of the type referred to presented a very serious problem.

It is an object of the present invention to provide a mechanical seal of the type referred to that may effectively be employed in connection with highly abrasive and/or corrosive liquids at high temperatures and/or pressures.

Another object is to provide a mechanical seal embodying seal elements of equally hard materials and which remains effective for extended periods of time.

Still another object is to provide a mounting arrangement for seal elements made from cemented carbides, which will permit their incorporation in mechanical seals operating under severe conditions of wear, such as are imposed by highly abrasive liquids, high operating temperatures and the like.

These and other objects of the invention will become apparent from the following description of the accompanying drawings in which:

Fig. 1 is a vertical sectional view of a seal embodying the invention, applied to the shaft of a pump.

Fig. 2 is a sectional view taken along line 2—2 of Figure 1.

Fig. 3 is a sectional view taken along line 3—3 of Figure 1.

Fig. 4 is an exploded detail view of several components of the seal structure illustrated in Figure 1.

The present invention is embodied in a shaft seal which is shipped to the consumer as a unit and which may be applied as such unit to the particular hydraulic mechanism which is to be sealed. Having specific reference to Figure 1, the numeral 8 designates a liquid pump wherein a rotary shaft 9 passes through a circular aperture 5 in one wall 7 of the stationary pump housing. The annular opening between the shaft 9 and wall 7 must be sealed to prevent leakage from the interior of the pump 8. For such purpose, the mechanical seal embodying the present invention may be inserted as a unit between the shaft and the housing of the pump.

As shown in Figure 1, the seal unit includes a mounting disc 6 of annular configuration which is slipped over the protruding end of shaft 9 and is bolted to the exterior of the wall 7 of the pump 8 as indicated at 6a. An O-ring 10 seated in a recess 11 in the disc 6 sealingly engages the pump wall 7 to prevent leakage between these two stationary members. A sleeve 12 whose internal bore is commensurate with the pump shaft 9 encompasses said shaft and is in turn encompassed at a point intermediate its ends by the annular disc 6. This sleeve 12 is adapted to rotate with the shaft 9, and the basic seal elements are disposed between it and the described disc 6, as will become apparent.

The basic seal elements comprise a pair of similar rings 13, 14 which surround the sleeve 12 in a manner to be fully described hereinafter, so that their sides 13a and 14a, respectively, which are flat and smoothly finished, will abut thus preventing the passage of any fluid therebetween. One ring 14 is supported to rotate with the pump shaft 9, while the other, 13, remains stationary.

In accordance with the present invention, each ring is compounded of a hard material, preferably one of the cemented carbides, such as tungsten carbide or boron carbide, so that prolonged use will be possible even when liquids of high abrasive content are handled. One of a pair of similar annular cups 16, 17 receives each seal ring. To permit the expansion of the brittle carbide seal rings 13, 14 under increased operating temperatures without strain on, or cracking of, the rings, the supporting cups or any other parts of the device, the cups 16, 17 should be constructed of a resilient or semi-resilient material. A synthetic rubber may be employed to form the supporting cups under normal conditions. However, the present invention contemplates the provision of a seal which will remain effective under abnormal operating conditions and more particularly under such greatly increased temperatures, as may preclude the use of synthetic rubber. Consequently, I provide supporting cups which are constructed of a semi-resilient, heat and corrosive-resistant material, such as tetrafluoro-ethylene, commercially known as "Teflon." With the described composition of the seal rings 13, 14 and the supporting cups 16, 17, respectively, it has been found that an effective seal is provided for highly corrosive and abrasive liquids at temperatures up to 400° F.

Heretofore, the seal elements were fitted tightly into their respective supporting cups in such a manner that the frictional engagement between each cup and its seal ring within was sufficient to prevent relative rotation therebetween during operation of the pump, and under ordinary conditions the degree of resilience of the Teflon is sufficient to render harmless the differential expansion between each carbide seal and its supporting cup. However, to adapt the seal for operation under extreme conditions of temperature, I construct each seal ring and its respective supporting cup sufficiently different in size so that the former will fit easily into the latter. Thus, the danger that the cups or the rings may be cracked by differential expansion with increasing temperature is practically eliminated. In order that the seal rings may under such conditions maintain their position within their respective cups, that is, rotate, or remain stationary, in unison with their respective cups, diametrically opposed notches 18 are provided on the periphery of each ring 13, 14 for the reception of correspondingly positioned projections 19 within their respective supporting cups 16, 17 (Fig. 4), whereby each cup and ring are locked against relative rotation. The exterior of each cup is also provided with diametrically opposed projections or ridges 20 by means of which each cup may be keyed to a circular notched seat. One seat 21 is provided on the inner surface of the annular disc 6 which has an integral collar portion 22 having notches 23 formed therein (Fig. 1). It will accordingly be understood that the seal ring 13 and its supporting cup 16 mounted within said seat 21 are rigidly retained against rotation, since the disc 6 is bolted to the stationary wall 7 of the pump as hereinbefore described. The other seat 24 is formed by the counterbored end 25 of a barrel 26 which serves as the mounting member for the second supporting cup. The inner cylindrical surface of the counterbored end of said barrel is provided with notches 27 to receive the ridges 20 on the second supporting cup 17 (Fig. 4). The barrel 26 is slidably supported on the sleeve 12, but is secured for rotation therewith by means of a pair of pins 28 which protrude into axially extending slots 29 formed in the outer surface of the sleeve 12. Accordingly, the barrel 26, second cup 17, and seal ring 14 rotate as a unit with the sleeve 12.

At the other end of the barrel 26, a recess 30 is provided to receive a packing 31 and a movable collar 32 (Fig. 1). A compression spring 33 helically encompassing the sleeve 12 is interposed between a lip 34 on the left extremity thereof and the movable collar 32 to urge the latter to the right as viewed in Fig. 1. The spring 33 consequently urges the collar 32 against the packing 31 causing the latter to establish an effective seal between the barrel 26 and the sleeve 12. In addition, the spring 33 provides the requisite sealing pressure between the faces 13a and 14a of the seal rings 13, 14 since its urgency is transmitted through the slidable barrel 26 to the supporting cup 17 received in the counterbored end 25 thereof and presses in this manner the rotatable seal ring 14 seated within said cup 17 against the stationary seal ring 13. Furthermore, the thrust against the stationary ring 13 maintains said latter ring firmly against the circular seat 21 provided in the annular disc 6.

The described sealing pressure between the faces 13a and 14a of the seal rings 13, 14 is solely determined by the construction of the spring 33 and the degree of compression placed thereon, and means are incorporated to permit adjustment of said compression from a point exterior of the pump without disassembly of the parts of the seal unit. For this purpose, a collar 35 encompasses the sleeve 12 at a point exterior of the pump wall 7 to the right of the annular disc 6, as shown in Fig. 1. At this point, the sleeve 12 is formed with a shoulder 36 which is axially grooved at diametrically opposing points, as indicated at 36a, for the reception of set screws 37 that extend through threaded radial bores 38 in the collar 35. Upon tightening said screws 37, the contiguous portion of the sleeve 12 is deformed to frictionally engage the shaft 9 whereby relative rotary and axial movement between the shaft and the sleeve is precluded without disfigurement of the shaft, such as is caused by the conventional direct engagement of the shaft by the set screw.

A packing 39 is pressed against the right extremity 40 of the sleeve 12 by a packing gland 41 to prevent leakage between the shaft 9 and the sleeve 12. Cap screws 42 pass through holes 43 in the packing gland 41 and enter threaded bores 44 in the set collar 35 to enable the application of pressure to the described shaft packing 39 to maintain the same in proper and effective sealing condition.

Upon loosening of the set screws 37 in the set collar 35, the sleeve 12 may be moved axially relative to the shaft 9 and the pump housing 7 to vary the degree of compression of the spring 33. A convenient exterior adjustment of the pressure between the faces 13a and 14a of the seal rings 13 and 14 is thereby attainable.

After the described seal unit has been tested at its point of manufacture, it is easily removed from its test installation by loosening the set screws 37 in the set collar 35 and by removing the bolts which secure the annular disc 6 to the housing 7. The unit may then be slipped from the pump shaft 9, while the seal faces 13a and 14a remain in engagement with each other so that they are not exposed to any disfigurement. Subsequent to removal, the unit may be shipped to the consumer where a reversal of procedure enables rapid installation.

Due to the use of cemented carbides for the seal rings and the use of Teflon for the supporting cups, and due to the novel manner in which the seal rings are mounted in said cups, the mechanical seal described hereinbefore shows a minimum of wear and is not subject to cracking due to expansional strains. It remains effective over prolonged periods of time even when employed to confine liquids of pronounced corrosive and/or abrasive character at abnormally high temperatures.

Whereas portions of the seal unit are specifically described, it will be readily apparent that the concepts of the present invention should not be limited to the specific constructional details illustrated and described by way of example which may be departed from without departing from the spirit of the invention as expressed in the appended claims.

What I claim and desire to protect by Letters Patent is:

1. A mechanical seal for a shaft extending through an aperture in a wall, comprising two mounting members encompassing the shaft in axially spaced relation to each other, means for rigidly securing one of the mounting members to the wall, means for supporting the other mounting member from the shaft for rotation therewith and for axial movement with respect to the same, a supporting cup mounted on and in sealing engagement with each of the mounting members, an external abutment integral with each of said supporting cups, an abutment integral with each of said mounting members and in abutting engagement with the abutment of the associated cup in surfaces each of which extends axially and substantially radially of the shaft for keying the cup and the associated mounting member against rotary movement with respect to each other, a seal ring disposed in each of said supporting cups in sealing engagement therewith, an internal abutment integral with each of said cups, an abutment integral with each of said seal rings and in abutting engagement with the internal abutment of the associated cup in surfaces each of which extends axially and substantially radially of the shaft for keying the cup and associated seal ring against rotary movement with respect to each other, each of said supporting cups being formed of a material having a sufficiently high shear strength to prevent shearing said internal and external abutments and sufficiently yielding to maintain sealing engagement between the supporting cup and the associated seal ring, and means for urging the movable mounting member axially of the shaft to press the seal ring associated therewith into sealing engagement with the other seal ring.

2. In a mechanical seal for a rotatable member, a mounting member disposed around the rotatable member and having an annular recess in an end thereof, a support member snugly fitting at its outer periphery within said mounting member recess and in sealing engagement therewith, abutment members respectively integral with the mounting member and the support member and engaging each other in surfaces each of which extends both axially and substantially radially of the rotatable member to key the support member and the mounting member against relative rotary movement, means defining a socket in said support member concentric with the rotatable member, a seal ring disposed in said socket in sealing engagement with the support member and composed of brittle, dimensionally variable material having a smooth and highly polished seal surface facing outwardly of the socket, and a second set of abutment members respectively integral with the support member and the seal ring and engaging each other in surfaces each of which extends axially and substantially radially of the rotatable member to key the support member and the seal ring against relative rotary movement, said support member being formed of a material having sufficient shear strength to prevent severance of the abutment members of the seal ring, sufficiently yieldable to avoid overstressing the seal ring upon the occurrence of dimensional variation of the seal ring, and sufficiently resilient to maintain sealing engagement with said seal ring through the range of dimensional variation thereof occurring during normal operation of the mechanical seal.

References Cited in the file of this patent

UNITED STATES PATENTS

| | | |
|---|---|---|
| 1,835,877 | Joyce | Dec. 8, 1931 |
| 1,904,568 | Taylor | Apr. 18, 1933 |
| 2,100,220 | King | Nov. 23, 1937 |
| 2,253,969 | Dawihl et al. | Aug. 26, 1941 |
| 2,301,723 | Vedovell | Nov. 10, 1942 |
| 2,308,114 | Schjolin | Jan. 12, 1943 |
| 2,390,892 | McCormack | Dec. 11, 1945 |
| 2,395,095 | Brady | Feb. 19, 1946 |
| 2,446,243 | Reynolds | Aug. 3, 1948 |
| 2,494,598 | Waring | Jan. 17, 1950 |
| 2,525,365 | Meyer | Oct. 10, 1950 |
| 2,554,406 | Hastings | May 22, 1951 |
| 2,583,867 | Meyer | Jan. 29, 1952 |
| 2,615,739 | Vedovell | Oct. 28, 1952 |